Nov. 17, 1925.  
A. I. WOODRING ET AL  
1,561,679  
SELF LUBRICATING NUT  
Filed Sept. 29, 1923
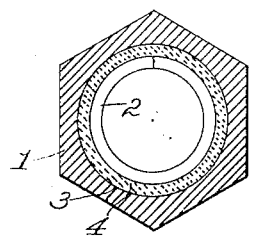
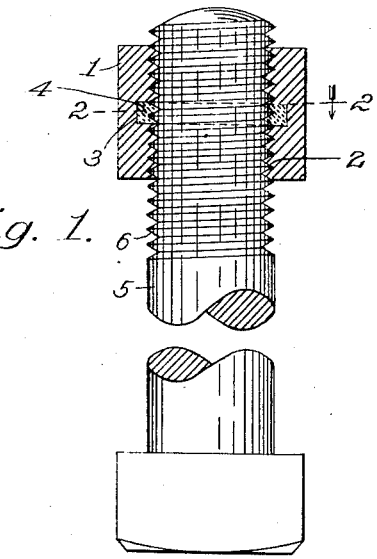
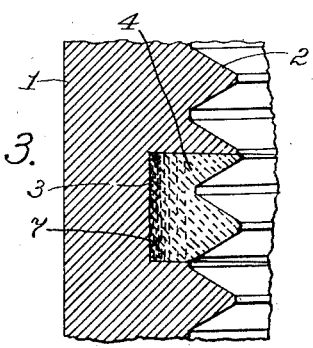
Inventors,
A. I. Woodring, and
W. G. Lamb, by
G. E. Kennedy,
Attorney.

Patented Nov. 17, 1925.

1,561,679

UNITED STATES PATENT OFFICE.

ALBERTO I. WOODRING AND WILLIAM G. LAMB, OF WATERLOO, IOWA.

SELF-LUBRICATING NUT.

Application filed September 29, 1923. Serial No. 665,682.

*To all whom it may concern:*

Be it known that we, ALBERTO I. WOODRING and WILLIAM G. LAMB, citizens of the United States of America, and residents of Waterloo, Blackhawk County, Iowa, have invented certain new and useful Improvements in Self-Lubricating Nuts, of which the following is a specification.

Our invention relates to improvements in self-lubricating nuts, and the object of our improvement is to insure proper and complete lubrication of nuts and like devices which have interior threads to mesh with bolts or the like.

This object we have accomplished by the means which are hereinafter described, claimed, and illustrated in the accompanying drawings, in which Fig. 1 is a central longitudinal section of one of our self-lubricating nuts having a threaded bolt meshed therewith, part of the bolt being broken away. Fig. 2 is a cross section of the nut only on the broken line 2—2 of said Fig. 1, showing the annular groove filled with a semi-solid lubricant. Fig. 3 is an enlarged detail view of a part of an interiorly threaded nut having its interior groove filled with a lubricant, both being shown in longitudinal section, the bolt removed.

Referring to said Fig. 1, the numeral 5 denotes a threaded and headed bolt of an ordinary type having its exterior thread 6 meshed with the root of the interior thread 2 of a nut 1.

Our improvement consists in supplying an annular groove 3 in the inner wall of the opening of the nut 1 to intersect and eliminate one or more turns of its interior thread 2, and this groove may be of any shape of cross section and may be deeper than the root of the thread 2, as is shown in said figure so as to serve to receive and hold a supply of any suitable lubricant, such as a semi-solid grease 4. The groove is preferably of rectangular cross section as shown, and may be made in any convenient manner, such as turning it after the formation of the thread 2.

This groove 3 in eliminating one or more turns of the thread 2, permits the maximum of lubricating efficiency because any turning or rotation of the nut 1 in either direction upon the bolts 5 will force some of the lubricant between the meshing threads and any slight adjustment less than a single rotation of the nut will subserve this purpose.

In Fig. 3 is illustrated a part of a large nut to which our improved self-lubricating means is applied and is peculiarly useful. Such larger nuts and the like are difficult to shift upon or be removed from a threaded bolt or other body upon which they are mounted when rusted, as the rust which gathers in the joint acts as a cement or adhesive between the opposed thread surfaces. The provision of the capacious annular rectangular groove 3 permits it to not only hold a sufficient supply of hard grease lubricant 4, but affords room for the groove to receive particles of rust or dirt which turning of the nut forces into the grooves from the joint between the opposed threads of the meshed nut and bolt. This heavier substance works to the bottom of the groove as is indicated at 7 and does not impair the lubricant which penetrates the joint moving outwardly therethrough on any turning, no matter how little of the nut. The sharp edge of the thread of the bolt passing through said groove, scoops out of the groove some of the grease 4 therein forcing the grease onwardly through the joint. When the bolt is removed from the nut, as shown in Fig. 3 its thread 6 has left a molded thread in the grease, showing the close contact of the thread 6 therewith in lubricating the latter.

The lubricant 4 in the annular groove 3 fills the joint between the meshed threads all around, and thus provides a seal against passage of dust, sand, or rust particles, as these subside to the bottom of the groove if they enter the sealing lubricant around the joint next the groove.

Having described our invention, what we claim as new, and desire to secure by Letters Patent, is:

In combination, an interiorly threaded nut, and a threaded shaft whose threads are meshed with the nut threads and extend continuously through the nut, the nut having one or more threads intermediate its ends removed to provide an annular space around the shafts removed in isolation from the ends of the nut, said annular space being provided to receive an initial charge of a pastry lubricant to continuously lubricate the shaft threads as turned therethrough, the lubricant being thereby held between said nut and shaft in said annular space to close their interspace against the transmission past said annular space of comminuted particles.

Signed at Waterloo, Iowa, this 26th day of September, 1923.

ALBERTO I. WOODRING.
WILLIAM G. LAMB.